United States Patent
Illiano (10) Patent No.: US 8,963,476 B2
(45) Date of Patent: Feb. 24, 2015

(54) SYNCHRONOUS MACHINE WITH SWITCHING ELEMENT IN THE EXCITATION CIRCUIT

(75) Inventor: Enzo Illiano, Lugano (CH)

(73) Assignee: BRUSA Elektronik AG, Sennwald (CH)

( * ) Notice: Subject to any disclaimer, the term of this patent is extended or adjusted under 35 U.S.C. 154(b) by 160 days.

(21) Appl. No.: 13/821,576

(22) PCT Filed: Mar. 2, 2012

(86) PCT No.: PCT/IB2012/050987
§ 371 (c)(1),
(2), (4) Date: Mar. 8, 2013

(87) PCT Pub. No.: WO2012/123847
PCT Pub. Date: Sep. 20, 2012

(65) Prior Publication Data
US 2013/0193903 A1 Aug. 1, 2013

Related U.S. Application Data

(60) Provisional application No. 61/451,988, filed on Mar. 11, 2011.

(30) Foreign Application Priority Data

Mar. 11, 2011 (EP) .................................. 11157883

(51) Int. Cl.
*H02P 1/46* (2006.01)
*H02P 25/02* (2006.01)
(Continued)

(52) U.S. Cl.
CPC .............. *H02P 25/021* (2013.01); *H02P 9/123* (2013.01); *H02P 9/302* (2013.01); *H02P 25/026* (2013.01); *H02P 2207/05* (2013.01)
USPC ............... 318/700; 318/47; 318/89; 318/148; 318/712; 363/44; 363/174; 363/175; 310/12.18; 310/162; 361/47; 361/268

(58) Field of Classification Search
USPC ........ 318/89, 148, 154, 47, 700, 712; 361/47, 361/149, 245, 268; 363/21.06, 21.14, 44, 363/81, 107, 108, 174, 175; 310/12.18, 310/162; 359/244
See application file for complete search history.

(56) References Cited

U.S. PATENT DOCUMENTS

| | | | |
|---|---|---|---|
| 3,984,755 A | 10/1976 | Lehnhoff et al. | |
| 4,106,069 A | 8/1978 | Trautner et al. | |

(Continued)

FOREIGN PATENT DOCUMENTS

| | | | |
|---|---|---|---|
| AT | 362456 B | 5/1981 | |
| CA | 1106915 B | 8/1981 | |

(Continued)

OTHER PUBLICATIONS

International Search Report and International Preliminary Report on Patentability, dated May 10, 2013 from parent International Application PCT/IB2012/050987 (in English).

(Continued)

*Primary Examiner* — Antony M Paul
(74) *Attorney, Agent, or Firm* — George Kapsalas; Patentbuero Paul Rosenich AG (57) ABSTRACT

A separately excited synchronous machine ($1b1k$) with an excitation circuit on the side of the rotor includes an excitation winding (3) and a power supply for the excitation winding (3) as well as a switching element ($8a$, $8e$) for connecting the power supply to the excitation winding (3). Further, the synchronous machine ($1b1k$) comprises a first stator-side primary winding ($5a5f$) and a first rotor-side secondary winding ($6a6f$). Moreover, the synchronous machine ($1b1k$) may comprise a) a tap of the first rotor-side secondary winding ($6d$) connected to a control element ($9a$, $9e$) of the switching element ($8a$, $8e$) or b) a second rotor-side secondary winding ($14d$), which is coupled to the first stator-side primary winding ($5a5f$) and connected to a control element ($9a$, $9e$) of the switching element ($8a$, $8e$).

22 Claims, 6 Drawing Sheets

(51) Int. Cl.
*H02P 9/12* (2006.01)
*H02P 9/30* (2006.01)

(56) References Cited

U.S. PATENT DOCUMENTS

| | | | |
|---|---|---|---|
| 4,152,636 | A | 5/1979 | Gorden |
| 4,336,486 | A | 6/1982 | Gorden et al. |
| 4,591,775 | A | 5/1986 | Nussel et al. |
| 4,823,067 | A | 4/1989 | Weber |
| 7,154,249 | B2 | 12/2006 | Velhner et al. |
| 7,498,776 | B2 | 3/2009 | Nishimura |
| 8,018,206 | B2 | 9/2011 | Weigel |
| 2006/0181249 | A1 | 8/2006 | Velhner et al. |
| 2008/0284386 | A1 | 11/2008 | Nishimura |
| 2009/0153105 | A1 | 6/2009 | Czajkowski |
| 2009/0230927 | A1 | 9/2009 | Patterson |
| 2010/0134056 | A1 | 6/2010 | Yamamoto et al. |
| 2011/0121773 | A1* | 5/2011 | Schmidt et al. ............... 318/716 |
| 2012/0007428 | A1 | 1/2012 | Rozman et al. |

FOREIGN PATENT DOCUMENTS

| | | |
|---|---|---|
| DE | 1211319 B | 2/1966 |
| DE | 1638344 A1 | 9/1969 |
| DE | 1763299 A1 | 10/1971 |
| DE | 2127497 A1 | 12/1972 |
| DE | 2737541 A1 | 2/1978 |
| DE | 102005047551 A1 | 4/2007 |
| DE | 102008032210 A1 | 1/2010 |
| EP | 0152719 A1 | 8/1985 |
| EP | 0254129 A1 | 1/1988 |
| EP | 1926205 A1 | 5/2008 |
| JP | S58-036198 A | 3/1983 |
| WO | 93/20614 A1 | 10/1993 |

OTHER PUBLICATIONS

Wikipedia: "Gleichrichter", Internet Citation, Feb. 25, 2013, pp. 1-10, cited in PCT-ISR from URL:http//de.wikipedia.org/w/index.php?title=gleichrichter&oldid=85743528 [retrieved on Apr. 25, 2013], machine translation to English made with MicrosoftTranslator online on Jun. 13, 2013.

European Search Report and EPO preliminary report on patentability mailed Aug. 23, 2011 from priority EPO application No. EP11157883.

* cited by examiner

Fig. 1
(State of the Art)

SYNCHRONOUS MACHINE WITH SWITCHING ELEMENT IN THE EXCITATION CIRCUIT

This application is a 35 U.S.C. 371 national-phase entry of PCT International application no. PCT/IB2012/050987 filed on Mar. 2, 2012 and also claims benefit of priority to prior European application no. EP11157883 filed on Mar. 11, 2011, and also claims priority as a non-provisional of U.S. provisional application Ser. No. 61/451,988 filed on Mar. 11, 2011, and both European application no. EP11157883 and U.S. provisional application Ser. No. 61/451,988, as well as parent PCT International application no. PCT/IB2012/050987, are all incorporated herein by reference in their entireties for all intents and purposes, as if identically set forth in full herein.

The invention relates to a separately excited synchronous machine with an excitation circuit on the rotor side, comprising an excitation winding, a power supply for the excitation winding, a switching element for connecting the power supply to the excitation winding, a first stator-side primary winding and a first rotor-side secondary winding, which is coupled to the first stator-side primary winding and at least partially forms the power supply of the rotor circuit.

Synchronous machines have been known for a long time and are used for a multitude of applications both as a motor and a generator. Above all they are used under the term "brushless direct current motor" for a variety of drives, for example in electric cars. Here the rotary field of the stator is generated from a direct current with the aid of an inverter. Further, synchronous machines may be divided into permanently excited and separately excited synchronous machines. With permanent excitation the rotor field is generated by a permanent magnet, whereas with separate excitation the rotor field is generated by an excitation winding on the rotor side (through which a direct current flows).

To this end, a separately excited synchronous machine frequently comprises a rectifier rotating together with the rotor winding, which is supplied with alternating current either via slip rings or via a rotary transformer and which converts this alternating current into a direct current for the rotor winding. If the excitation winding is magnetised in this way, the rotor rotates together synchronously with a rotary field applied to the stator.

In addition to the known problems during start-up of a synchronous machine which can easily "fall out of step" (load torque exceeding breakdown torque at a polar wheel angle of 90°), there is also the problem of achieving a quick demagnetisation of the rotor which is advantageous for a quick shut-off operation or a fast responding regulation of the synchronous machine. Otherwise currents are induced into the stator over a longer period of time until the rotor field decays of it own accord and this may cause damage to the connected devices.

In particular with electric cars the synchronous machine may also be used as an "electrical clutch" thus avoiding the need for a mechanical clutch. Here the rotor field is switched off and the synchronous machine can then run freely. This coupling operation should be completed quickly thereby enabling the drive torque, for example in an emergency situation, to be removed quickly from the driving wheels of the electric car.

To solve this problem reference is made for example to the WO 1993/020614A1 known from the state of the art, which discloses demagnetisation of the rotor of a synchronous machine via a rotating resistance which in normal operation is short-circuited via a thyristor. Activation of the thyristors is effected via slip rings.

The problem with this solution is that because of the relative movement between wiper and slip ring the former can very quickly lift off the latter, thereby leading to errors in activating the thyristor, in particular when both wiper and slip ring are soiled or worn. This circumstance may be acceptable when using a thyristor which once ignited remains conductive, but is no longer acceptable when other quickly reacting switching elements are employed. Also, reliable solutions are needed for safety-critical applications such as for drives in electric cars.

Another example for demagnetisation of the rotor of a brushless generator is known from US 2006/0181249A1. The problem with this solution is that it is complex and works always on the full voltage of the second winding. Furthermore, a long time is needed for the demagnetisation.

Furthermore, JP 58-036198A discloses an arrangement to suppress the voltage rise of a generator at the time of breaking a load by inserting a resistor in series with a field circuit of the generator after the load is interrupted. For this reason a parallel circuit of a resistor and a switch is inserted into the field circuit of a synchronous generator, wherein the switch is normally closed. When a load is interrupted so that the voltage of a bus is lowered, a voltage drop detector is operated to open the switch. Hence, the resistor is connected in series with a field coil. In this manner, the voltage rise at the time of interrupting the load can be suppressed.

Finally, US 2009/153105A1 discloses a generator comprising: a generator stator comprising a main secondary winding delivering an output voltage; at least one auxiliary winding; and an exciter field winding powered by the auxiliary winding(s); a regulator for regulating the output voltage of the generator; and a generator rotor comprising an exciter secondary winding; a rotary field winding powered by the exciter secondary winding; and a control circuit for controlling the power supply to the rotary field winding and configured to maintain the amplitude of the output voltage from the generator at a predetermined level by controlling the power supply to the rotary field winding in response to a control signal coming from the voltage regulator, the auxiliary winding(s) generating a voltage because they are exposed to a varying magnetic field generated by the rotary field winding in rotation. The signals from the voltage regulator are transmitted from the stator side to the rotor side by means of a dedicated transformer.

However, the arrangement proposed by US 2009/153105A1 is relatively complicated. Accordingly, such a generator is expensive and at the same time the risk of failure is comparably high because of the complicated arrangement.

The invention proposes to fill the requirement of an improved synchronous machine. More particularly the requirement is to ensure safe and quick demagnetisation of the rotor with low additional technical effort.

According to the invention this requirement is met by a synchronous machine of the kind mentioned in the beginning which comprises
a) a tap of the first rotor-side secondary winding connected to a control element of the switching element or
b) a second rotor-side secondary winding, which is coupled to the first stator-side primary winding and connected to a control element of the switching element.

On the one hand, the control signal for the switching element is no longer affected by contact errors between a wiper and a slip ring. The switching element can thus be reliably activated at any time thus enabling the rotor to be reliably demagnetised at any time. On the other hand, the arrangement only needs a low number of additional parts because the first stator-side primary winding is used for the power supply of the rotor circuit and for powering the control element of the switching element (case a and b). Additionally, also the first rotor-side secondary winding may be used for the power supply of the rotor circuit and for powering the control element of the switching element (case a). Accordingly, both the first stator-side primary winding and the first rotor-side secondary winding provide a double benefit then.

Following advantages are provided by the above arrangement:
  the rotor can be supplied with electrical energy in a contactless manner.
  in case a) the first rotary transformer is not only used to supply the excitation winding on the rotor side but also to activate the switching element resulting in the first rotary transformer fulfilling a double purpose.
  in case b) the first rotary transformer (comprising the first stator-side primary winding and the first rotor-side secondary winding) can be optimally designed to effect the supply of the excitation winding, whereas the second rotary transformer (comprising the first stator-side primary winding and the second rotor-side secondary winding) can be optimally designed to effect the activation of the switching element. Thus the rotary transformer can be constructed in a simpler and thus cost-effective way. By designing the two secondary windings in different ways they can nevertheless be optimally adapted to suit their purpose.

Although the invention is suitable, in particular, for a synchronous machine of an electric motor vehicle the invention is, of course, also applicable to synchronous machines for other purposes, in particular also to stationary plant.

Advantageous implementations and further developments of the invention result from the description when read in conjunction with the figures or which are thereby disclosed.

It is especially advantageous if the first and the second secondary windings are arranged on a common core in case b) thus further simplifying the construction of the rotary transformer and making it even more cost-effective.

It is also especially advantageous if the separately excited synchronous machine comprises a capacitor and/or an inductance which is arranged between the first secondary winding on the rotor side or the second secondary winding on the rotor side and the control element of the switching element and is connected with these in such a way that the switching element is opened with a delay after switch-off of a voltage at the common primary winding, for example after several milliseconds. In this way the switching element can be prevented from being activated if there is an unintended short-term drop in the excitation voltage or in the voltage gaps of a pulsating excitation voltage. Such voltage gaps are caused, for example, by a bridge rectifier on the rotor side or even more by a one-way rectifier on the rotor side, in particular in combination with an inverter on the stator side. In this respect the capacitor and/or the inductance mentioned are of low-pass character. In particular the capacity/inductivity can be rated such that the voltage gaps caused by an inverter on the stator side and/or a rectifier on the rotor side can (just) be bridged.

It is advantageous if the switching element is formed by a drain-source path of a field effect transistor and the control element is formed by the gate electrode of said transistor. Field effect transistors have a low on-resistance and a high off-resistance. Accordingly, in normal operating state of the synchronous machine the power dissipation is very low.

In this context it is especially advantageous if said capacitor/inductance is arranged between the gate electrode and the drain electrode or between the gate electrode and the source electrode of said transistor. Field effect transistors need just very low gate currents, why the switching element may be opened with a delay after switch-off of a voltage at the common primary winding by use of just small capacitances.

It is also especially advantageous, if said field effect transistor is adapted to dissipate an inductive energy stored in the excitation winding after switch-off of the field effect transistor, via its avalanche effect. With this variant therefore the energy stored in the excitation winding is directly converted into heat in the field effect transistor. An element connected in parallel to the transistor with a characteristic which is resistive at least in sections (for example a resistance, a varistor, a zener diode) may therefore be omitted resulting in a very simple construction of the rotor circuit.

Moreover it is advantageous if the switching element is formed by an emitter-collector path of an insulated gate bipolar transistor, the control element is formed by the gate electrode of said transistor and said capacitor/inductance is arranged between the gate electrode and the emitter electrode or between the gate electrode and the collector electrode. The insulated gate bipolar transistor combines the simple gate-drive characteristics of a field effect transistor with the high-current and low-saturation-voltage capability of bipolar transistors by combining an isolated gate field effect transistor for the control input and a bipolar power transistor as a switch. Accordingly, in normal operating state of the synchronous machine the power dissipation is even lower compared to a normal field effect transistor.

It is also favourable if the separately excited synchronous machine comprises an opto-coupler with a light source on the stator side and a light-sensitive element on the rotor side, which light element is connected to a control element of the switch element. This offers a further elegant possibility to transmit control signals from the stationary stator to the moving rotor in a contactless manner.

It is advantageous if the opto-coupler is arranged in the area of a rotational axis of the synchronous machine. In this way the light source on the stator side and the light-sensitive element on the rotor side always lie opposite each other, even when the rotor rotates. This ensures that the opto-coupler always functions reliably.

In addition it is advantageous if the separately excited synchronous machine comprises an element for storing electrical energy, which element enables activation of the switching element even if the rotor circuit is not supplied with power. This measure prevents the switching element from being switched off too early, if the excitation voltage drops for a short time or pulses because of a rectifier in the rotor circuit. The energy-storing element may again be an inductance, a capacitor (in particular a so-called "supercap") and/or an accumulator. In contrast to the above-mentioned variant where the switching element is triggered with a delay, it is possible here to actively activate the switching element for the entire period during which the energy-saving element makes electrical energy available.

It is also advantageous if an element with a characteristic which is resistive at least in sections, is arranged in parallel to the switching element. A (linear) resistor, a varistor (also called VDR—voltage dependent resistor) or even a zener diode may, for example, be provided in parallel to the switching element for converting inductive energy stored in the excitation winding into heat.

The above implementations and further developments of the invention may be combined in a variety of ways.

The present invention will be explained in detail with reference to the embodiments shown in the schematic figures of the drawing, in which.

In the figures of the drawings identical and similar components are marked using the same reference symbols, and elements and features with similar functions, insofar as nothing else has been defined, are also marked with identical reference symbols but different indices. Readers shall understand that in the description the terms "connected" or "coupled," and related terms, are used in an operational sense and are not necessarily limited to a direct connection or coupling.

Figure 1:
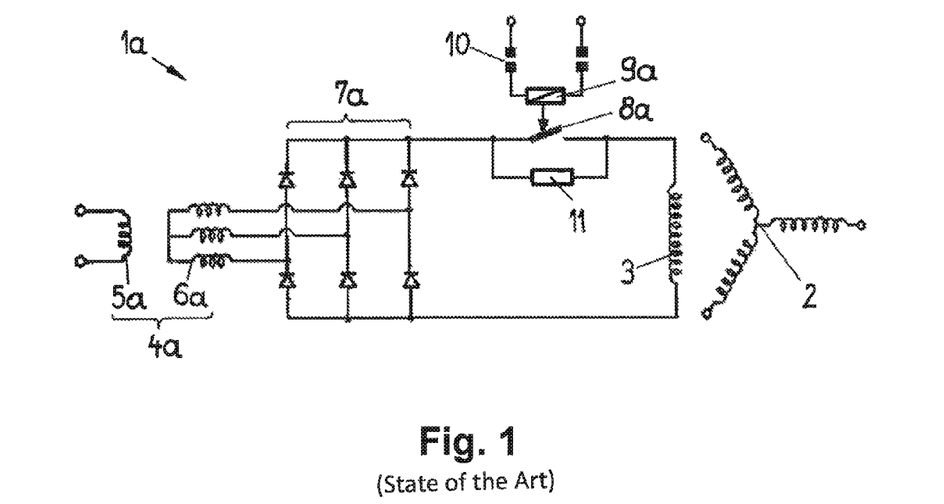
FIG. 1 shows a schematically drawn synchronous machine according to the state of the art.

FIG. 1 schematically depicts a separately excited synchronous machine 1a according to the state of the art. The synchronous machine 1a comprises a stator 2, an (rotor-side) excitation winding 3, a first rotary transformer 4a with a first stator-side primary winding 5a and three first rotor-side secondary windings 6a as well as a rectifier 7a connected thereto. The rotor circuit comprising the excitation winding 3 and the rectifier 7a further has a switching element 8a arranged in it which is provided for interrupting the rotor circuit. In the present example the switching element 8a is activated by a control coil 9a and forms a relay with the same. The connections of the control coil 9a lead to stationary stator-side connections via slip rings 10. Finally a resistance 11 is connected in parallel to the switching element 8a.

The function of the synchronous machine 1a according to the prior art is as follows:

When an alternating voltage is applied to the first stator-side primary winding 5a an alternating voltage is induced in the first rotor-side secondary windings 6a which voltage is converted into a direct voltage with the aid of rectifier 7a. If the switching element 8a is closed a direct current flows through the excitation winding 3 thus causing therein the rotor magnetic field. The rotary transformer 4a and the rectifier 7a thus form the power supply of the rotor circuit/the excitation winding 3. When an alternating current is applied to the stator 2, the rotary field being created in stator 2 creates a rotary torque on the rotor in the known manner.

In order to eliminate the rotary field when the synchronous machine 1a is shut down the switching element 8a can be activated on the stator side via the slip rings 10 and be opened as required, i.e. when the synchronous machine 1a is shut down allowing the rotor current and thus the rotor magnetic field to quickly decay via the resistance 11.

Figure 2:
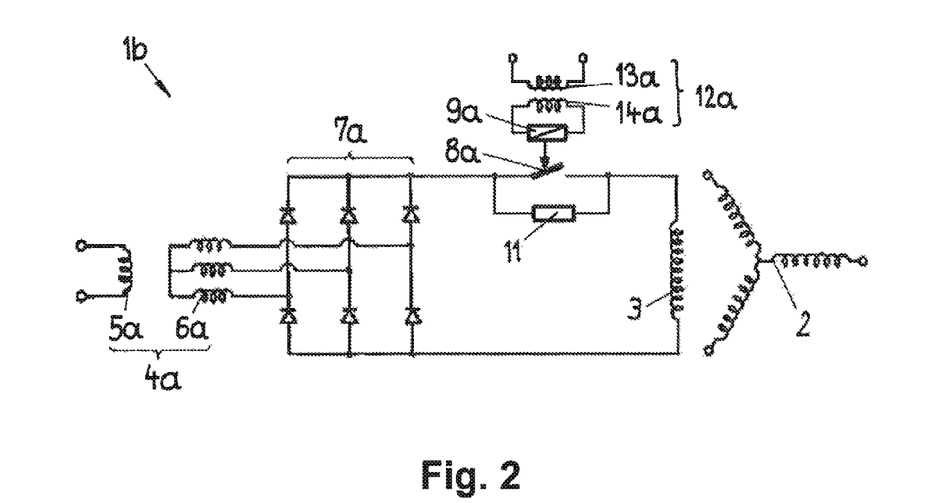
FIG. 2 shows a first schematically drawn synchronous machine according to the invention with a second rotary transformer for activating the switching element.

FIG. 2 shows a synchronous machine 1b according to the invention which, instead of the slip rings 10, comprises a second rotary transformer 12a with a second stator-side primary winding 13a and second rotor-side secondary winding 14a, which is connected to the control element 9a of switching element 8a. In this way the switching element 8a can be advantageously activated in a contactless manner. This has the effect of effectively avoiding any "fluttering" of the switching element 8a due to poor contact-making between the slip rings 10 and the wipers (FIG. 1), in particular if this arrangement is soiled or worn. It is thus possible to safely activate the switching element 8a at any given time.

Further, instead of resistance 11, another element with a characteristic which is resistive at least in sections may be arranged in order to convert the inductive energy stored in the excitation winding 3 into heat, for example a varistor or a zener diode, acting as a resistive load 11.

Figure 3:
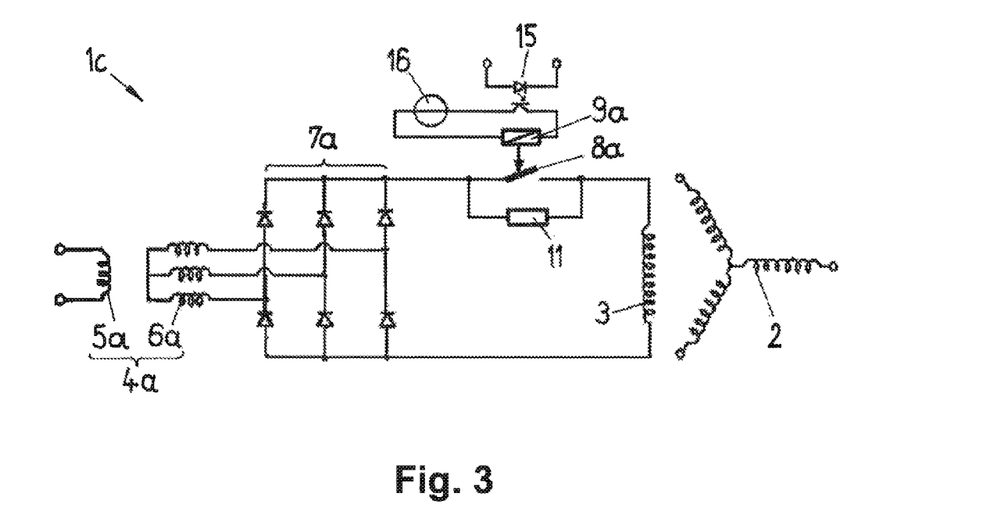
FIG. 3 shows a second schematically drawn synchronous machine according to the invention with an opto-coupler for activating the switching element.

FIG. 3 shows an alternative synchronous machine 1c according to the invention where an opto-coupler 15 is provided instead of a second rotary transformer 12a. This may be used to connect a voltage source 16 rotating with the rotor to the control coil 9a in order to activate the switching element 8a in this way. The voltage source 16 may, for example, be a capacitor or an accumulator which is also fed from the power supply of the rotor circuit. This element for storing electrical energy permits the (at least short-term) activation of the switching element 8a even if there is no energy supply to the rotor circuit. Alternatively the switching element 8a may be formed directly by the opto-coupler 15, i.e. by its photo-transistor. For example, solid-state relays may be used for this purpose, which are optically activated.

Advantageously the opto-coupler 15 is arranged in the area of a rotational axis of the synchronous machine 1c so that the light source and the photo-element of the opto-coupler 15 always lie opposite each other, even if the rotor rotates.

Figure 4:
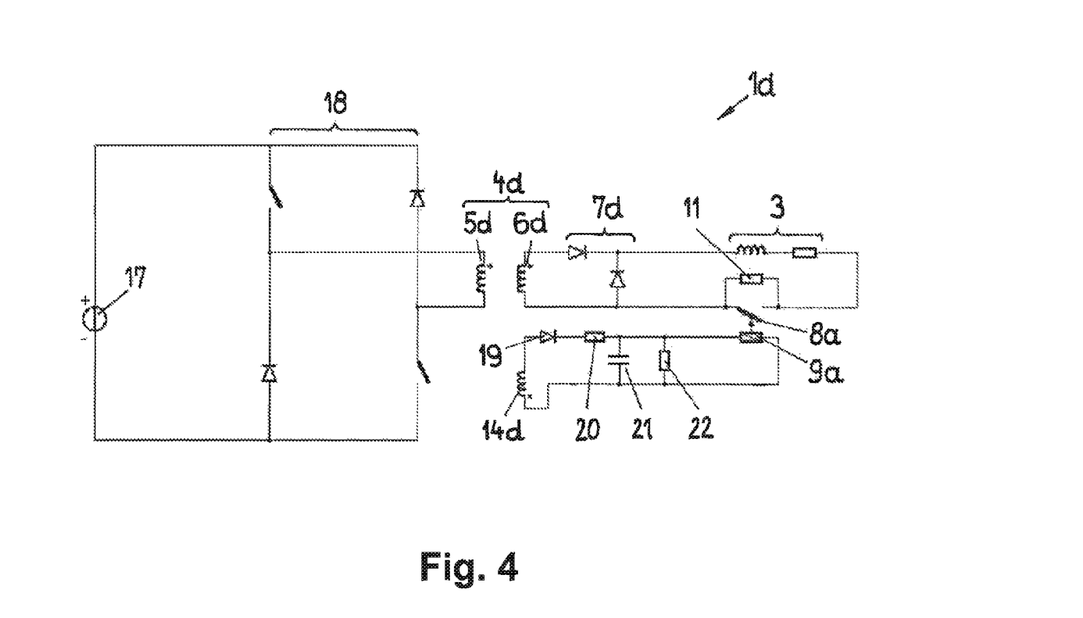
FIG. 4 shows a further variant of the synchronous machine with a combined rotary transformer.

FIG. 4 shows a further variant of a synchronous machine 1d according to the invention (stator winding not shown). The synchronous machine 1d comprises a stator-side (direct) voltage source 17 which supplies the first stator-side primary winding 5d with electrical energy via an inverter 18. This is transferred via the first rotor-side secondary winding 6d and a combination of a rectifier diode and a free-wheeling diode 7d to the excitation winding 3 (shown here as a replacement circuit diagram of ideal inductance and an ideal ohmic resistance). In the same way as above the rotor circuit arrangement comprises a switching element 8a with a resistance 11 connected in parallel thereto. Instead of inverter 18 any other inverter design may, of course, be used.

Further, the synchronous machine 1d comprises a control circuit rotating with the rotor, which circuit comprises a second rotor-side secondary winding 14d, a diode 19, a resistance 20 and a capacitor 21, a further resistance 22 as well as the control coil 9a. In this example the first rotary transformer and the second rotary transformer comprise a common primary winding 5d. Advantageously the first and the second secondary winding 6d, 14d are arranged on a common core.

The function of the synchronous machine 1d is as follows:

As long as the first stator-side primary winding 5d is supplied with energy an alternating voltage is induced in the second rotor-side secondary coil 14d with the aid of which a capacitor 21 is charged via the diode 19 and the resistance 20.

The resistance 20 serves to limit the charging current. Thus a voltage is also present at the control coil 9a which keeps the switching element 8a closed. Now, if the synchronous machine 1d is shut down and the first stator-side primary winding 5d is no longer supplied with energy, the capacitor 21 is discharged via the control coil 9a and the resistance 22 resulting in the switching element 8a being opened with a delay (for example a few milliseconds) after the rotor current supply has been switched off, thereby causing the rotor magnetisation to decay quickly.

The synchronous machine 1d thus comprises a capacitor 21 which is arranged between the second rotor-side secondary winding 14d and the control element 9a of the switching element 8a and is connected with this in such a way that the switching element 8a is opened with a delay after a voltage at the common primary winding 5d has been removed.

Advantageously this prevents the switching element 8a from being activated for an unintended short-term drop in the excitation voltage or in the voltage gaps of a pulsating excitation voltage, such as may be caused by the inverter 18 and the rectifier diode of combination 7d. The capacitor 21 and the resistance 22, in particular, may be rated in such a way that the voltage gaps mentioned are bridged.

Figure 5:
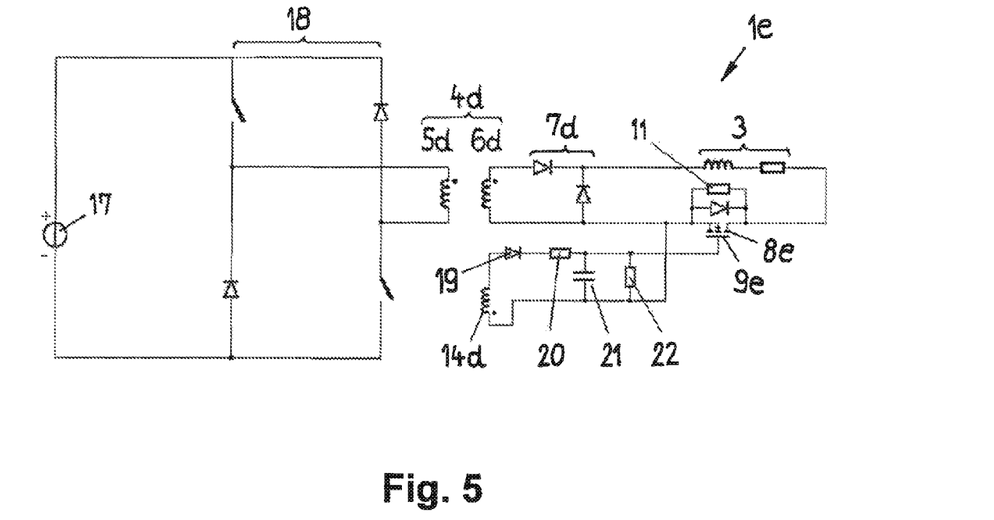
FIG. 5 shows the synchronous machine of FIG. 4 but with a field effect transistor as switching element.

In FIG. 5 a further variant of a synchronous machine 1e according to the invention is shown, which variant is very similar to the synchronous machine 1d shown in FIG. 4. Instead of the relay formed by the switching element 8a and the control element 9a, however, a field effect transistor (FET), in fact a MOSFET (metal oxide semiconductor field effect transistor) is provided the drain-source path of which is formed by the switching element 8e and the gate electrode of which is formed by the control element 9e. In particular, where a field effect transistor is used, the resistance 11 may be omitted if the field effect transistor is adapted to dissipate inductive energy stored in the excitation winding 3 via its avalanche effect after it has been switched off.

Figure 6:
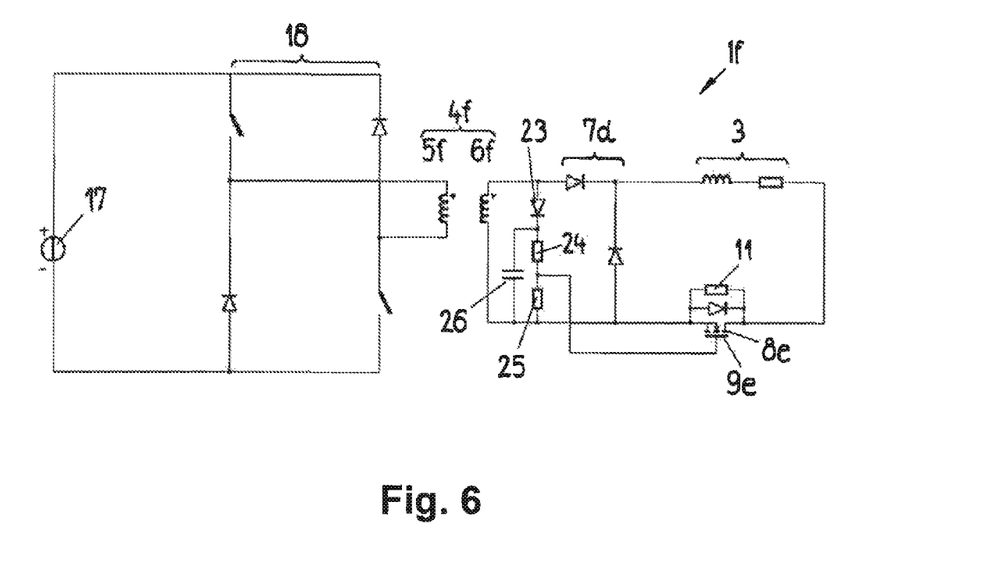
FIG. 6 shows a variant of the synchronous machine according to the invention with a rotary transformer with only one primary winding and one secondary winding.

FIG. 6 shows a further implementation of the synchronous machine 1f according to the invention, where the second rotor-side secondary coil has been omitted and only the first rotor-side secondary coil 6d has been provided. The synchronous machine 1f comprises a series connection consisting of a diode 23 and a voltage divider formed of two resistances 24 and 25 parallel to the first secondary coil 6d. A capacitor 26 is connected in parallel to the voltage divider 24, 25.

The function of the synchronous machine 1f is as follows:

As long as the first stator-side primary winding 5f is supplied with energy an alternating voltage is induced also in the first rotor-side secondary coil 6f with the aid of which the capacitor 26 is charged via the diode 23. Thus a voltage is also present via the voltage divider 24, 25 at the gate electrode 9e, which keeps the drain-source path 8e conductive. If the synchronous machine 1f is shut down and the first stator-side primary winding 5f is no longer supplied with energy, the capacitor 26 is discharged via the resistances 24 and 25, resulting in the switching element 8e, in this variant of the invention also, being switched off with a delay as the rotor power supply is switched off, thus causing the magnetisation of the rotor to decay.

Figure 7:
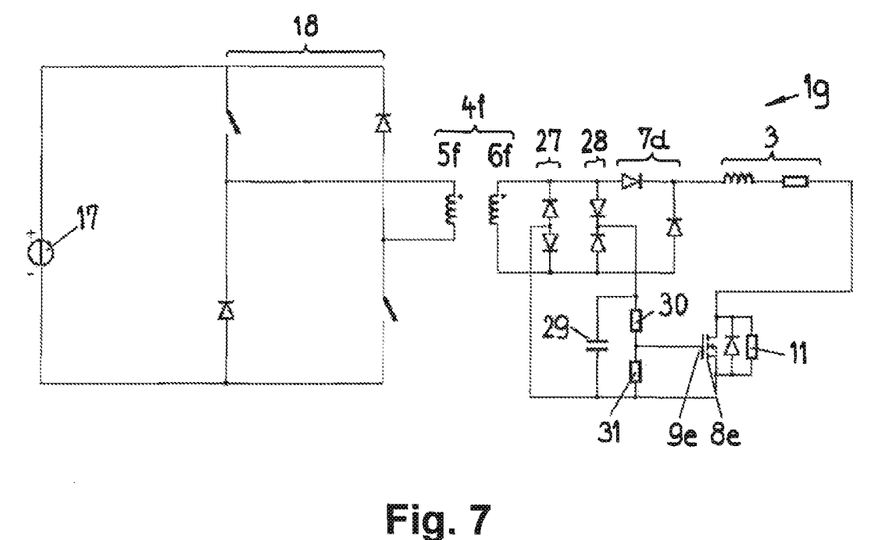
FIG. 7 shows a synchronous machine according to the invention as in FIG. 6, but with different activation of the switching element.

FIG. 7 furthermore shows a further variant of the synchronous machine 1g where only a first secondary coil 6f is present. Further the anti-parallel diodes 7d are connected in parallel with two further branches respectively comprising two anti-parallel diodes 27 and 28. In this way two full-bridge rectifiers are created which share branch 27, and these are the full-bridge rectifier 27 and 28 and the full-bridge rectifier 27 and 7d. The full-bridge rectifier 27, 7d has the excitation coil 3 as well as the switching element 8e (drain-source path of the FET) with parallel-connected resistance 11 connected to it. The full-bridge rectifier 27, 28 has a parallel connection consisting of a capacitor 29 and a voltage divider with resistances 30 and 31 connected to it.

As long as the first stator-side primary winding 5f is supplied with energy an alternating voltage is induced also in the first rotor-side secondary coil 6f with the aid of which the capacitor 29 is charged via the full-bridge rectifier 27 and 28. Thus a voltage is present also at the gate electrode 9e via the voltage divider 30, 31, which keeps the drain-source path 8e conductive. When the synchronous machine 1g is shut down and no longer supplies energy to the first stator-side primary winding 5f, the capacitor 29 is discharged via the resistances 30 and 31 resulting in the switching element 8e of this variant of the invention also, being switched off with a delay as the rotor power supply is switched off, thus causing the magnetisation of the rotor to decay.

Figure 8:
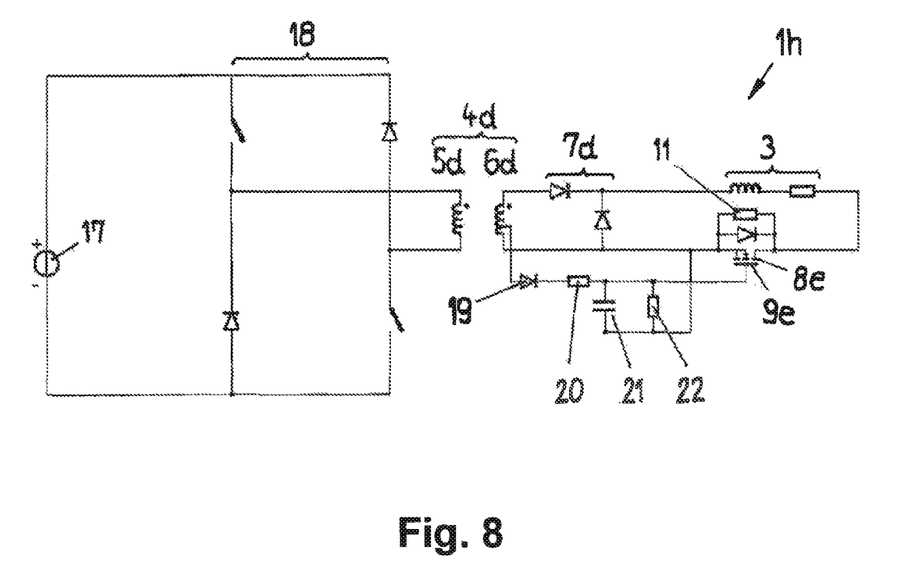
FIG. 8 shows a synchronous machine, wherein a tap of the first rotor-side secondary winding is connected to a control element of the switching element.

FIG. 8 furthermore shows a variant of a synchronous machine 1h, which is very similar to the synchronous machine 1e of FIG. 5. By contrast, a tap of the first rotor-side secondary winding 6d is connected to a control element 9e of the switching element 8e. In this way, a separate second secondary winding may be omitted.

Figure 9:
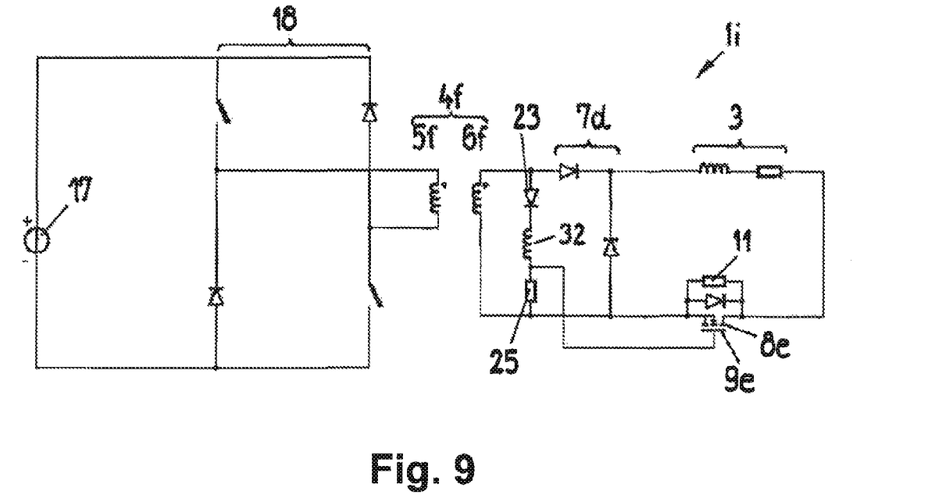
FIG. 9 shows an arrangement similar to FIG. 6 but with an inductance instead of a capacitor to control the switching element.

FIG. 9 shows an arrangement similar to FIG. 6 but with an inductance 32 instead of a capacitor 26 to control the switching element 8e. The function of the arrangement of FIG. 9 is also very similar to the function of the arrangement shown in FIG. 6. Energy is stored in the inductance 32 and keeps the switching element 8e open for a while when the voltage of the first rotor-side secondary winding 6f breaks down.

Figure 10:
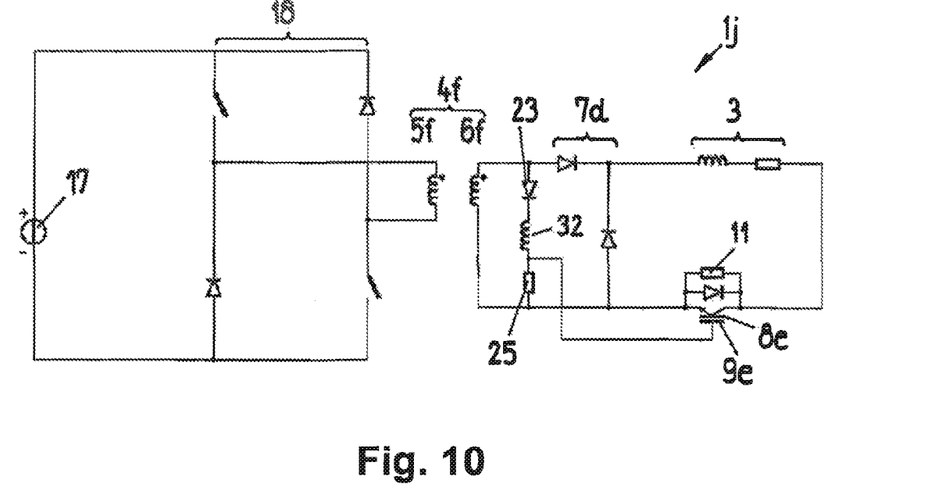
FIG. 10 shows an arrangement similar to FIG. 9 but with an IGBT instead of a FET as a switching element and FIG. 11 shows an arrangement similar to FIG. 7 but with different polarity of the first rotor-side secondary winding.

FIG. 10 shows an arrangement similar to FIG. 9 but with an IGBT instead of a FET as a switching element 8e. Of course, the use of IGBTs is not limited to an arrangement according to FIG. 9 but can be used also in other arrangements. For example, an IGBT may be used as switching element 8e in the arrangements of FIGS. 5 to 8.

It should be noted at this point that the switching elements 8a and 8e are, albeit advantageous for the invention, to be understood merely as an example/exemplary, and not in any way as being limiting. Readers having the skills of artisans of ordinary skill in the relevant arts shall readily understand that other switches/switching elements may be used as alternatives, for example thyristors.

Furthermore the polarity of the first stator-side primary winding 5a ... 5f, relative to the first rotor-side secondary winding 6a ... 6f, may be different from that shown (i.e. the points shown at the windings 5a ... 5f and 6a ... 6f would then lie diagonally to each other).

Figure 11:
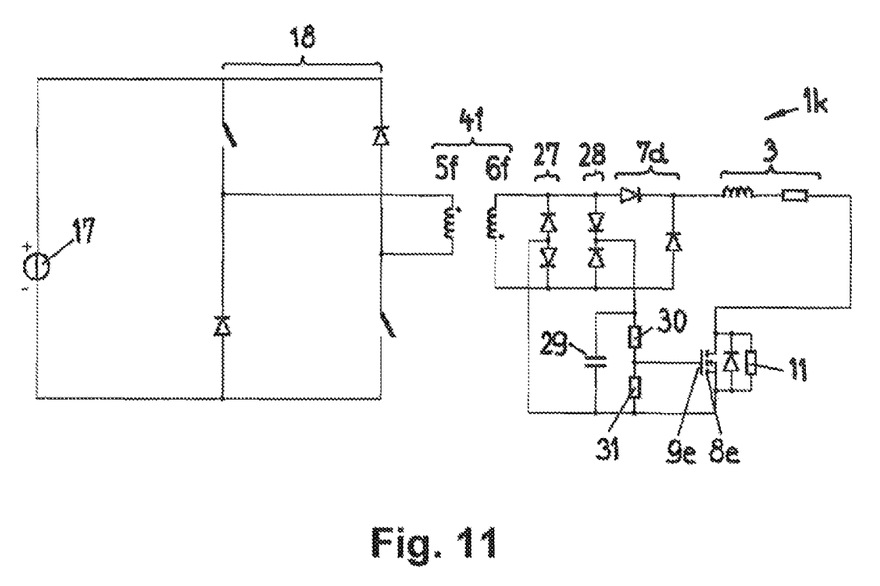

FIG. 11 shows such an arrangement which is similar to the arrangement of FIG. 7. In contrast, the first rotor-side secondary winding 6f has a different polarity.

LIST OF REFERENCE SYMBOLS

1a ... 1k separately excited synchronous machine
2 stator winding
3 rotor winding
4a ... 4f first rotary transformer
5a ... 5f first stator-side primary winding
6a ... 6f first rotor-side secondary winding
7d rectifier/free-wheeling diode combination
8a, 8e switching element
9a, 9e control element
10 slip ring
11 resistance
12a second rotary transformer
13a second stator-side primary winding 14a, 14d second rotor-side secondary winding
15 opto-coupler
16 (rotor-side) voltage source
17 (stator-side) voltage source
18 inverter
19 diode
20 resistance
21 capacitor
22 resistance
23 diode
24, 25 voltage divider
26 capacitor
27 first branch of a bridge rectifier
28 second branch of a bridge rectifier
29 capacitor
30, 31 voltage divider
32 inductance

The invention claimed is:

1. A separately-excited synchronous machine comprising:
a rotor-side circuit arrangement;
an excitation circuit in said rotor-side circuit arrangement;
said excitation circuit having an excitation winding;
a power supply for said excitation winding;
a rotor-side secondary winding at least partially forming said power supply;
a switch configured to connect said power supply to said excitation winding;
said rotor-side secondary winding being electrically coupled to a first stator-side primary winding;
said rotor side secondary winding having a tap, said tap being connected to a control of said switch.

2. A separately-excited synchronous machine as claimed in claim 1, further comprising:
a capacitor connected between said rotor-side secondary winding and said control to open said switch with a delay after termination of voltage at said primary winding.

3. A separately-excited synchronous machine as claimed in claim 1, further comprising:
a field effect transistor drain-source path forming said switch;
a field effect transistor gate electrode forming said control; and,
a field effect transistor containing said drain-source path and said gate electrode.

4. A separately-excited synchronous machine as claimed in claim 3, further comprising:
a capacitor connected between said rotor-side secondary winding and said control, said capacitor being arranged between said gate electrode and a source electrode of said field effect transistor.

5. A separately-excited synchronous machine as claimed in claim 3, further comprising:
a capacitor connected between said rotor-side secondary winding and said control, said capacitor being arranged between said gate electrode and a drain electrode of said field effect transistor.

6. The separately-excited synchronous machine as claimed in claim 3, wherein:
said field effect transistor has an avalanche effect sufficient to dissipate stored inductive energy of said excitation winding subsequent to transistor cut-off.

7. A separately-excited synchronous machine as claimed in claim 1, further comprising:
an insulated gate bipolar transistor emitter-collector path forming said switch;
an insulated gate bipolar transistor gate electrode forming said control;
an insulated gate bipolar transistor containing said emitter-collector path and said gate electrode; and,
said capacitor being arranged between said gate electrode and a collector electrode of said insulated gate bipolar transistor.

8. A separately-excited synchronous machine as claimed in claim 1, further comprising:
an insulated gate bipolar transistor emitter-collector path forming said switch;
an insulated gate bipolar transistor gate electrode forming said control;
an insulated gate bipolar transistor containing said emitter-collector path and said gate electrode; and,
said capacitor being arranged between said gate electrode and an emitter electrode of said insulated gate bipolar transistor.

9. A separately-excited synchronous machine as claimed in claim 1, further comprising:
a zener diode arranged in parallel to said switch.

10. A separately-excited synchronous machine as claimed in claim 1, further comprising:
a varistor arranged in parallel to said switch.

11. A separately-excited synchronous machine comprising:
a rotor-side circuit arrangement;
an excitation circuit in said rotor-side circuit arrangement;
said excitation circuit having an excitation winding;
a power supply for said excitation winding;
a first rotor-side secondary winding at least partially forming said power supply;
a switch configured to connect said power supply to said excitation winding;
said first rotor-side secondary winding being electrically coupled to a first stator-side primary winding; and,
a second rotor-side secondary winding which is electrically coupled to said first stator-side primary winding, said second rotor-side secondary winding being connected to a control of said switch.

12. A separately-excited synchronous machine as claimed in claim 11, further comprising:
a common core, said first rotor-side secondary winding and said second rotor-side secondary winding being arranged on said common core.

13. A separately-excited synchronous machine as claimed in claim 11, further comprising:
a capacitor connected between said rotor-side secondary winding and said control to open said switch with a delay after termination of voltage at said primary winding.

14. A separately-excited synchronous machine as claimed in claim 11, further comprising:
a field effect transistor drain-source path forming said switch;
a field effect transistor gate electrode forming said control; and,
a field effect transistor containing said drain-source path and said gate electrode.

15. A separately-excited synchronous machine as claimed in claim 14, further comprising:
a capacitor connected between said rotor-side secondary winding and said control, said capacitor being arranged between said gate electrode and a source electrode of said field effect transistor.

16. A separately-excited synchronous machine as claimed in claim 14, further comprising:

a capacitor connected between said rotor-side secondary winding and said control, said capacitor being arranged between said gate electrode and a drain electrode of said field effect transistor.

17. The separately-excited synchronous machine as claimed in claim 14, wherein:
   said field effect transistor has an avalanche effect sufficient to dissipate stored inductive energy of said excitation winding subsequent to transistor cut-off.

18. A separately-excited synchronous machine as claimed in claim 11, further comprising:
   an insulated gate bipolar transistor emitter-collector path forming said switch;
   an insulated gate bipolar transistor gate electrode forming said control;
   an insulated gate bipolar transistor containing said emitter-collector path and said gate electrode; and,
   said capacitor being arranged between said gate electrode and a collector electrode of said insulated gate bipolar transistor.

19. A separately-excited synchronous machine as claimed in claim 11, further comprising:
   an insulated gate bipolar transistor emitter-collector path forming said switch;
   an insulated gate bipolar transistor gate electrode forming said control;
   an insulated gate bipolar transistor containing said emitter-collector path and said gate electrode; and,
   said capacitor being arranged between said gate electrode and an emitter electrode of said insulated gate bipolar transistor.

20. A separately-excited synchronous machine as claimed in claim 11, further comprising:
   a zener diode arranged in parallel to said switch.

21. A separately-excited synchronous machine as claimed in claim 11, further comprising:
   a varistor arranged in parallel to said switch.

22. A separately-excited synchronous machine comprising:
   a rotor-side circuit arrangement;
   an excitation circuit in said rotor-side circuit arrangement;
   said excitation circuit having an excitation winding;
   a power supply for said excitation winding;
   a rotor-side secondary winding at least partially forming said power supply;
   said rotor-side secondary winding being electrically coupled to a first stator-side primary winding;
   a switch configured to connect said power supply to said excitation winding;
   a resistive load connected in parallel to said switch;
   a control configured to controllably selectively open and close said switch;
   a control circuit containing said control, said control circuit including a rotor-side voltage source configured to power said control;
   an opto-coupler configured to controllably connect said rotor-side voltage source to said control so as to operate said switch, said opto coupler having a photo-sensitive element in said control circuit, and said opto-coupler having a controllable light source configured to provide a control signal to said photo-sensitive element.

* * * * *